United States Patent
Conway et al.

(10) Patent No.: US 6,418,504 B2
(45) Date of Patent: Jul. 9, 2002

(54) SYSTEM AND METHOD FOR COUPLING PERIPHERAL BUSES THROUGH A SERIAL BUS USING A SPLIT BRIDGE IMPLEMENTATION

(75) Inventors: Craig M. Conway, Round Rock; Kevin L. Schultz; B. Keith Odom, both of Georgetown; Glen O. Sescila, Pflugerville; Bob Mitchell; Ross Sabolcik, both of Austin; Robert Hormuth, Cedar Park, all of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/876,003

(22) Filed: Jun. 6, 2001

Related U.S. Application Data

(63) Continuation of application No. 09/092,342, filed on Jun. 5, 1998
(60) Provisional application No. 60/052,123, filed on Jul. 10, 1997, and provisional application No. 60/050,399, filed on Jun. 20, 1997.

(51) Int. Cl.$^7$ ............................................. G06F 13/20
(52) U.S. Cl. .................. 710/313; 710/306; 710/314; 710/315; 710/62; 710/63; 710/69; 710/71
(58) Field of Search ................... 710/101–103, 710/128–129, 2, 4, 31, 36, 28, 62–63, 64, 72–74, 127, 126, 69–71

(56) References Cited

U.S. PATENT DOCUMENTS

| | | |
|---|---|---|
| 3,946,379 A | 3/1976 | Lippman |
| 4,023,144 A | 5/1977 | Koenig |
| 4,451,886 A | 5/1984 | Guest et al. |
| 4,468,737 A | 8/1984 | Bowen |
| 4,514,823 A | 4/1985 | Mendelson et al. |

(List continued on next page.)

OTHER PUBLICATIONS

PCI Local Bus Specification, Production Version, Revision 2.0 dated Apr. 30, 1993.

*Primary Examiner*—Robert Beausoleil
*Assistant Examiner*—Raymond N Phan
(74) *Attorney, Agent, or Firm*—Conley, Rose & Tayon PC; Jeffrey C. Hood

(57) ABSTRACT

A Wide Area Serial PCI system for connecting peripheral devices to a computer. The WASP system includes a host computer system connected through a serial bus to a remote device. The serial bus can range from several meters to several kilometers or more. The host computer system includes a CPU and memory, and also includes a first Peripheral Component Interconnect (PCI) bus, also referred to as the local PCI bus. A primary bridge according to the present invention is coupled to the first PCI bus. The primary bridge includes PCI interface circuitry for interfacing to the first PCI bus. The remote device is located remotely from the computer system and comprises a second or remote PCI bus and one or more peripheral devices coupled to the second PCI bus. The remote device also includes a secondary bridge coupled to the second PCI bus. The secondary bridge includes PCI interface circuitry for interfacing to the second PCI bus. The serial bus is coupled between the primary bridge and the secondary bridge. Each of the primary bridge and secondary bridge include parallel/serial transceivers for converting parallel data generated on the first PCI bus and second PCI bus, respectively, to serial data for transmission on the serial bus and for converting serial data received from the serial bus to parallel data for generation on the first PCI bus and second PCI bus, respectively. The primary bridge and the secondary bridge collectively implement a PCI—PCI bridge register set.

57 Claims, 6 Drawing Sheets

WASP Block Diagram

U.S. PATENT DOCUMENTS

| | | | |
|---|---|---|---|
| 4,577,317 A | 3/1986 | Chu et al. | |
| 4,866,609 A | 9/1989 | Calta et al. | |
| 4,959,833 A | 9/1990 | Mercola et al. | |
| 5,054,024 A | 10/1991 | Whetsel | |
| 5,062,059 A | 10/1991 | Youngblood et al. | |
| 5,081,624 A | 1/1992 | Beukema | |
| 5,325,491 A | 6/1994 | Fasig | |
| 5,731,863 A | 12/1994 | Silver | |
| 5,455,911 A | 10/1995 | Johansson | |
| 5,572,525 A | 11/1996 | Shen et al. | |
| 5,619,659 A | 4/1997 | Kikinis et al. | |
| 5,655,112 A | 8/1997 | MacInnis | |
| 5,678,057 A | 10/1997 | Rostoker et al. | |
| 5,724,529 A * | 3/1998 | Smith et al. | 710/129 |
| 5,764,924 A | 6/1998 | Hong | |
| 5,781,747 A | 7/1998 | Smith et al. | |
| 5,838,935 A * | 11/1998 | Davis et al. | 710/129 |
| 5,850,571 A * | 12/1998 | Odom et al. | 710/28 |
| 5,926,120 A | 7/1999 | Swenson et al. | |
| 5,953,511 A * | 9/1999 | Sescila, III et al. | 710/129 |
| 6,003,105 A | 12/1999 | Vicard et al. | |
| 6,070,214 A * | 5/2000 | Ahern | 710/129 |
| 6,112,311 A * | 8/2000 | Beardsley et al. | 714/3 |

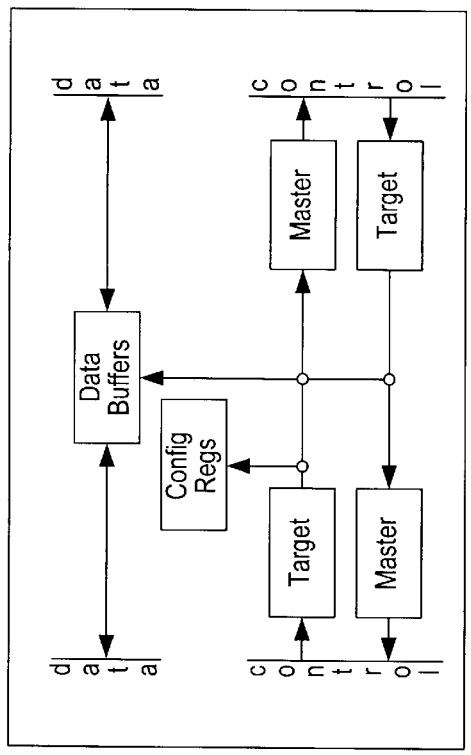
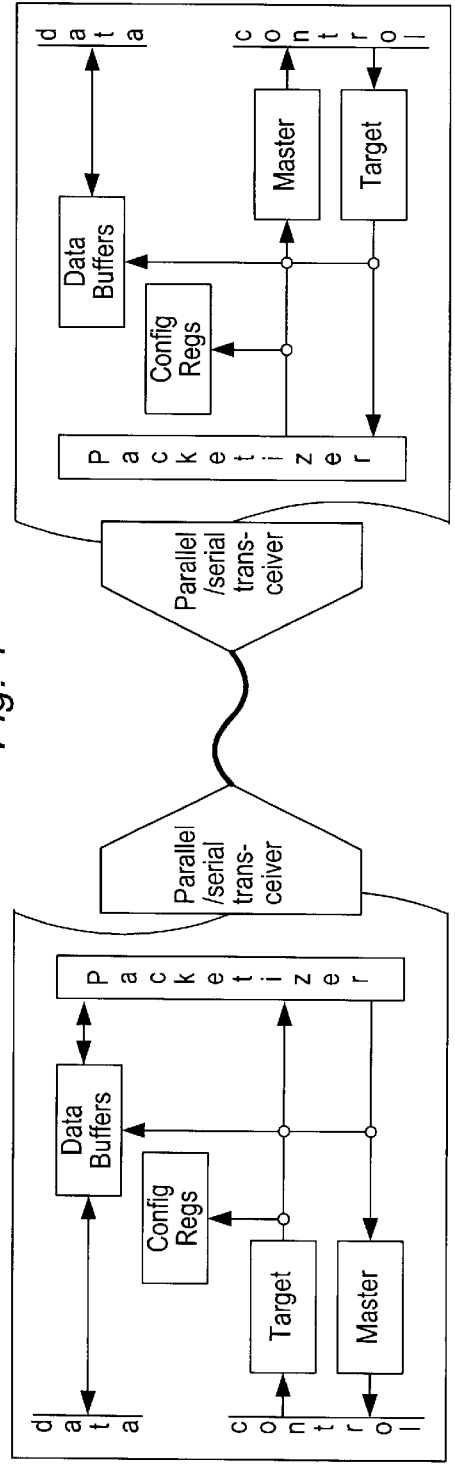

*WASP Block Diagram*

*I/O Transaction Forwarding Map*

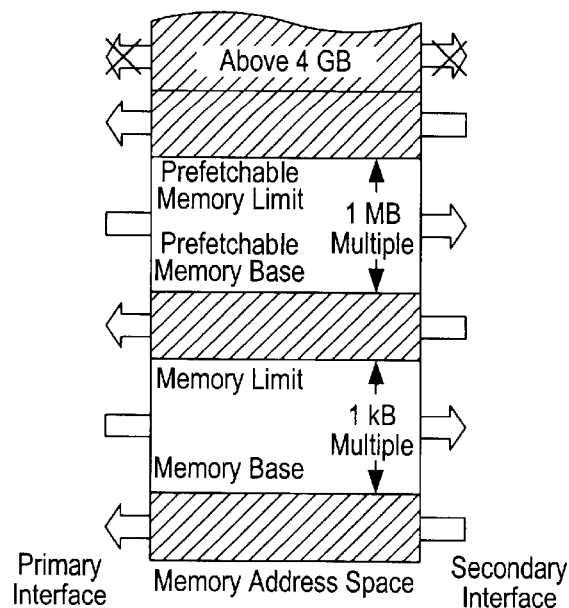

*Memory Transaction Forwarding Map*
Fig. 5

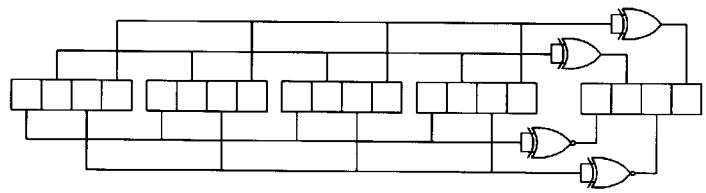

*WASP Frame Format and Parity Generation*
Fig. 6

| Description | | 17 | 16 | 15  12 | 11  8 | 7  4 | 3  0 |
|---|---|---|---|---|---|---|---|
| Posted Write | PW | U | ParErr | 1000 | PCI Cmd | PCI BE | Par |
| PCI Configuration | PCR | U | ParErr | 1001 | PCI Cmd | PCI BE | Par |
| Delayed Request 0 | DR0 | U | ParErr | 1100 | PCI Cmd | PCI BE | Par |
| Delayed Request 1 | DR1 | U | ParErr | 1101 | PCI Cmd | PCI BE | Par |
| Delayed Request 2 | DR2 | U | ParErr | 1110 | PCI Cmd | PCI BE | Par |
| Delayed Completion | DC | U | ParErr | 1111 | PCI Cmd | PCI BE | Par |
| Success Ack | SA | U | U | 0001 | U | U | Par |
| Failure Ack | FA | U | U | 0010 | U | U | Par |
| Sanity Check | SC | U | U | 0011 | U | U | Par |
| Reset | RST | U | U | 0100 | U | U | Par |
| Power On | POP | U | U | 0101 | U | U | Par |

*Command Packets*
Fig. 7

| Error Condition | Response |
|---|---|
| Bad PAR on title frame of command packet | ignore transfer |
| Bad PAR on packet count frame of command packet | submit Failure ACK if received packet is not a Failure ACK or Sanity Check |
| Bad PAR on data packet | submit Failure ACK |
| Receipt of data packet after fill frame (i.e. command packet did not start transfer) | ignore rest of transfer |
| Received packet count does not match packet counter | submit Failure ACK |

*Error Condition Responses*

*Fig. 8*

| Bits 33:32 | Bits 31:0 |
|---|---|
| 00 | Command Frame |
| 01 | PCI Address Frame or Regular Data Frame |
| 10 | PCI Data Frame |
| 11 | Reserved |

*RTQ Packet Encoding*

*Fig. 9*

SYSTEM AND METHOD FOR COUPLING PERIPHERAL BUSES THROUGH A SERIAL BUS USING A SPLIT BRIDGE IMPLEMENTATION

CONTINUATION AND PRIORITY DATA

This application is a continuation of U.S. patent application Ser. No. 09/092,342 titled "System and Method for Connecting Peripheral Buses Through a Serial Bus" filed on Jun. 5, 1998, which claims benefit of priority of U.S. Provisional application Ser. No. 60/052,123 titled "Wide Area Serial PCI" and filed Jul. 10, 1997, whose inventors were listed as Craig Conway, B. Keith Odom, Glen Sescila, Robert Hormuth, and Kevin Schultz, and which also claims benefit of priority of U.S. Provisional application Ser. No. 60/050,399 titled "Wide Area Serial PCI" and filed Jun. 20, 1997, whose inventor was listed as Craig Conway.

FIELD OF THE INVENTION

The present invention relates to computer architecture and more particularly to a system and method for interconnecting multiple PCI buses through a serial bus.

DESCRIPTION OF THE RELATED ART

The Peripheral Component Interconnect (PCI) Local Bus is a high performance, 32-bit or 64-bit bus with multiplexed address and data lines. It is intended for use as an interconnect mechanism between highly integrated peripheral controller components, peripheral add-in boards, and processor/memory systems. The PCI bus has emerged as a very popular expansion bus for many computer systems and embedded systems. A plethora of chipsets, devices, and controllers with a PCI bus interface have been marketed in the last few years. Examples of I/O functions performed by PCI products include high-speed graphics controllers, Small Computer System Interface (SCSI) controllers, Fiber Channel adapters, Serial Storage Architecture (SSA) adapters, and local area network (LAN) interface devices such as Ethernet, Token Ring and FDDI controllers.

Another popular I/O function in which PCI is used is in the area of instrumentation. An instrument is a device which collects data or information from an environment or unit under test and displays this information to a user. An instrument may also perform various data analysis and data processing on acquired data prior to displaying the data to the user. Examples of various types of instruments include data acquisition devices, oscilloscopes, digital multimeters, pressure sensors, etc. The types of information which might be collected by respective instruments include voltage, resistance, distance, velocity, pressure, frequency of oscillation, humidity or temperature, among others.

Modern instrumentation systems are moving from dedicated stand-alone hardware instruments such as oscilloscopes, digital multimeters, etc., to a concept referred to as virtual instrumentation. Virtual instrumentation systems comprise instrumentation hardware such as circuit boards which plug into general purpose personal computers. The instrumentation hardware is controlled by software which executes on the computers. Many virtual instrument hardware devices have been developed which plug into a PCI bus. Other popular instrumentation buses are the VXI (VMEbus eXtensions for Instrumentation) bus and General Purpose Interface Bus (GPIB).

In instrumentation applications, as well as others, often there is a need for the I/O function to be physically located remote from the host computer. For example, a data acquisition (DAQ) device may be required to be located in a test chamber which is separated by some distance from the host computer controlling it. One solution for remotely interfacing VXI instruments in a VXI chassis to a computer is the Multisystem eXtension Interface (MXI) bus.

The MXI bus is an open standard 32-bit general purpose system bus which interconnects up to eight MXI devices using a flexible cable. The MXI cable includes 32 multiplexed address and data lines with parity, address modifiers for multiple address spaces, single-level multi-master prioritized bus arbitration signals, a single interrupt line, a bus error line and handshake lines. MXI devices use memory-mapped read and write operations to access resources, such as registers and memory, of other MXI devices. The length of the MXI cable may be up to a maximum of 20 meters. In a typical configuration, a MXI interface card is connected to an expansion bus of the host computer, such as an ISA or PCI bus. Another MXI interface card is plugged into a VXI slot of the VXI instrument chassis, and the two interface cards are coupled together via a MXI cable.

One drawback of an MXI bus solution is the MXI bus interface cards and cables are not commodity items, and thus are relatively expensive. Thus, a solution is desired for remotely coupling PCI devices to a host computer. Since many PCI devices have already been developed, as well as associated device driver software for controlling them, it is highly desirable for the solution to require no modification to existing PCI device hardware and little or no modification to their associated device driver software.

One method currently used in the industry to connect PCI devices in a robust mechanical factor is CompactPCI. CompactPCI is an adaptation of the PCI mechanical form factor for industrial and/or embedded applications requiring a more robust mechanical form factor than Desktop PCI. CompactPCI is electrically compatible with the PCI specification and provides an optimized system for rugged applications. A new instrumentation standard based on the CompactPCI form factor is referred to as PXI (PCI eXtensions for Instrumentation).

It would be desirable for PCI expansion devices coupled to a remote PCI or PXI bus to appear to the computer system as if they were coupled directly to the local PCI bus in the computer system.

SUMMARY OF THE INVENTION

The present invention comprises a Wide Area Serial PCI system for connecting peripheral devices to a computer. The system comprises a host computer system which includes a CPU and memory, and also includes a first Peripheral Component Interconnect (PCI) bus. A primary bridge according to the present invention is coupled to the first PCI bus. The primary bridge includes PCI interface circuitry for interfacing to the first PCI bus. A remote device is located remotely from said computer system, wherein the remote device comprises a second or remote PCI bus and one or more peripheral devices coupled to the second PCI bus. A secondary bridge is coupled to the second PCI bus, wherein said secondary bridge includes PCI interface circuitry for interfacing to the second PCI bus. A serial bus is coupled between the primary bridge and the secondary bridge.

The primary bridge and secondary bridge are operable to transmit PCI bus cycles over the serial bus. The primary bridge is operable to receive PCI cycles on the first PCI bus and generate serial data on the serial bus in response thereto, and the secondary bridge is operable to receive the serial data from the serial bus and generate corresponding PCI cycles on the second PCI bus. In a similar manner the secondary bridge is operable to receive PCI cycles on the second PCI bus and generate serial data on the serial bus in response thereto, and the primary bridge is operable to receive the serial data from the serial bus and generate corresponding PCI cycles on the first PCI bus. In this manner, the CPU in the host computer system is operable to generate cycles on the first PCI bus to communicate with peripheral devices coupled to the second PCI bus. Likewise, the peripheral devices in the remote device coupled to the second or remote PCI bus can generate cycles on the second PCI bus to communicate with the CPU, memory or other devices in the computer system.

Thus, according to the present invention, the CPU is operable to generate cycles on the first PCI bus to communicate with a peripheral device, wherein the peripheral device is coupled to either the first PCI bus or the second PCI bus. In addition, software developed to communicate with a peripheral device coupled to the first PCI bus of the host computer can also be used to communicate with the peripheral device regardless of whether the peripheral device is coupled to the first PCI bus or the second PCI bus. Thus, to the CPU, the one or more peripheral devices coupled to the second PCI bus appear coupled to the first PCI bus. Stated another way, the one or more peripheral devices coupled to the second PCI bus are virtually coupled to said first PCI bus.

Each of the primary bridge and secondary bridge include parallel/serial transceivers for converting parallel data generated on the first PCI bus and second PCI bus, respectively, to serial data for transmission on the serial bus and for converting serial data received from the serial bus to parallel data for generation on the first PCI bus and second PCI bus, respectively. The primary bridge and the secondary bridge collectively implement a PCI—PCI bridge register set.

BRIEF DESCRIPTION OF THE DRAWINGS

A better understanding of the present invention can be obtained when the following detailed description of the preferred embodiment is considered in conjunction with the following drawings, in which:

FIG. 1: shows a PCI—PCI Bridge Block Diagram according to the prior art;

FIG. 1a shows a WASP System Block Diagram according to the present invention, including a primary WASP bridge and a secondary WASP bridge;

FIG. 5: illustrates the memory Transaction Forwarding Map;

FIG. 6: illustrates the WASP Frame Format and Parity Generation;

FIG. 7: illustrates WASP Command Packets;

FIG. 8: is a table describing the Error Condition Responses; and

FIG. 9: is a table describing the RTQ Packet Encoding.

Figure 2:
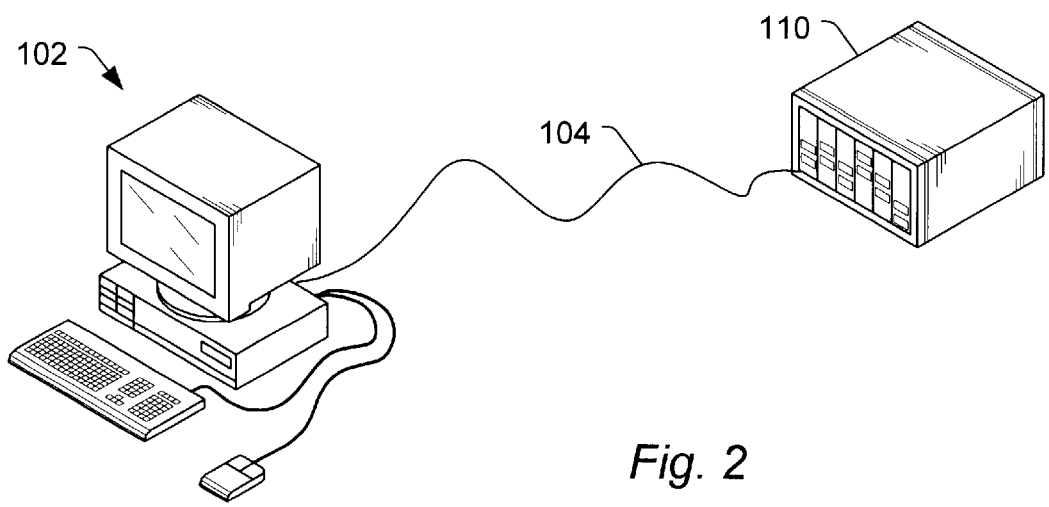
FIG. 2: shows a block diagram of a system utilizing the WASP of the present invention.

While the invention is susceptible to various modifications and alternative forms specific embodiments are shown by way of example in the drawings and will herein be described in detail. It should be understood however, that drawings and detailed description thereto are not intended to limit the invention to the particular form disclosed. But on the contrary the invention is to cover all modifications, equivalents and alternative following within the spirit and scope of the present invention as defined by the appended claims.

DETAILED DESCRIPTION OF THE PREFERRED EMBODIMENT

Incorporation by Reference:

The following materials may are hereby incorporated by reference as though fully and completely set forth herein:

U.S. Provisional application Ser. No. 60/052,123 titled "Wide Area Serial PCI" and filed Jul. 10, 1997, whose inventors are Craig Conway, B. Keith Odom, Glen Sescila, Robert Hormuth, and Kevin Schultz;

U.S. Provisional application Ser. No. 60/050,399 titled "Wide Area Serial PCI" and filed Jun. 20, 1997, whose inventor is Craig Conway;

PCI Local Bus Specification. Revision 2.1, available from Intel Corporation;

DIGITAL Semiconductor 21152 PCI-to-PCI Bridge (Order Number EC-QUW9D-TE), available from Digital Semiconductor;

PCI to PCI Bridge Architecture Specification, Revision 1.0, available from Intel Corporation;

CompactPCI Specification, Revision 2.1. available from PICMG;

CompactPCI Specification Short Form, Revision 2.1 (available from www.picmg.org), available from PICMG;

PXI Specification, Revision 1.0. available from National Instruments Corporation.

Introduction to WASP:

The WASP (Wide Area Serial PCI) is a PCI master/slave device implementing the PCI—PCI bridge register set. The WASP couples two physically separate PCI buses via a copper or fiber optic serial link. By using the PCI—PCI bridge register set, the WASP is automatically recognized by the system BIOS of a PC and will enable that BIOS to configure and provide information on devices on the remote PCI bus. This ensures that the software written for a PCI device will function the same whether that device exists inside the PC or is coupled to the PCI via the WASP serial PCI link.

The WASP of the present invention operates to provide a transparent link between two PCI buses. The WASP, for example, can replace MXI-2 in systems that connect a PC to a VXIbus or VMEbus backplane. The WASP or WASP system functions as a PCI to PCI bridge, connecting separate PCI buses. The WASP chipset implements a serial protocol, preferably the SerialPCI protocol, to provide a transparent serial link between two PCI buses.

Theory of Operation:

FIG. 1 is a prior art diagram which illustrates the basic block diagram of a PCI—PCI bridge. The PCI—PCI bridge couples two PCI buses transparently; however, the bridge must reside on the same printed circuit card as the secondary PCIbus it bridges. By maintaining the PCI—PCI bridge paradigm but splitting the bridge into two halves connected by a serial link, the WASP of the present invention can couple completely separate PCI buses, on the order of a few meters apart to a few kilometers apart.

FIG. 1A illustrates the WASP of the present invention. As shown, by maintaining the PCI—PCI bridge paradigm but splitting the bridge into two halves connected by a serial link, the WASP of the present invention can couple completely separate PCI buses, on the order of a few meters apart to a few kilometers apart.

The left half of the system shown above corresponds to the upstream, or primary, PCI interface. It contains the Type 1 Configuration register set as required for PCI—PCI bridges. Upon recognizing this interface, the PC BIOS can enumerate and configure PCI devices on the secondary PCI bus which is controlled by the right half of the system shown above. This half is the downstream, or secondary, interface. Note that while both the primary and secondary interfaces have configuration registers, they are preferably only accessible via accesses on the primary PCI bus. The registers of the secondary interface are only accessible via the serial link. The secondary PCI interface does not respond to PCI cycles except to pass them upstream.

A full Serial PCI solution requires two WASPs with a copper or fiber serial link between them. The WASP has two modes: Primary and Secondary. The name of each mode corresponds to the hierarchy of PCI buses to which the respective WASPs connect.

FIG. 2 illustrates a WASP system according to one embodiment of the present invention. As shown, the present invention comprises a Wide Area Serial PCI system for connecting peripheral devices to a computer. The WASP system includes a host computer system 102 connected through a serial bus 104 to a remote device 110. The serial bus 104 can range from several meters to several kilometers or more. The serial bus 104 may be any of various types of physical connections, such as copper wire, coaxial cable, or fiber optic cable, among others. The serial bus 104 may also implement various types of protocols, such as IEEE 1394 or IEEE 1394.2, among others.

Figure 2A:
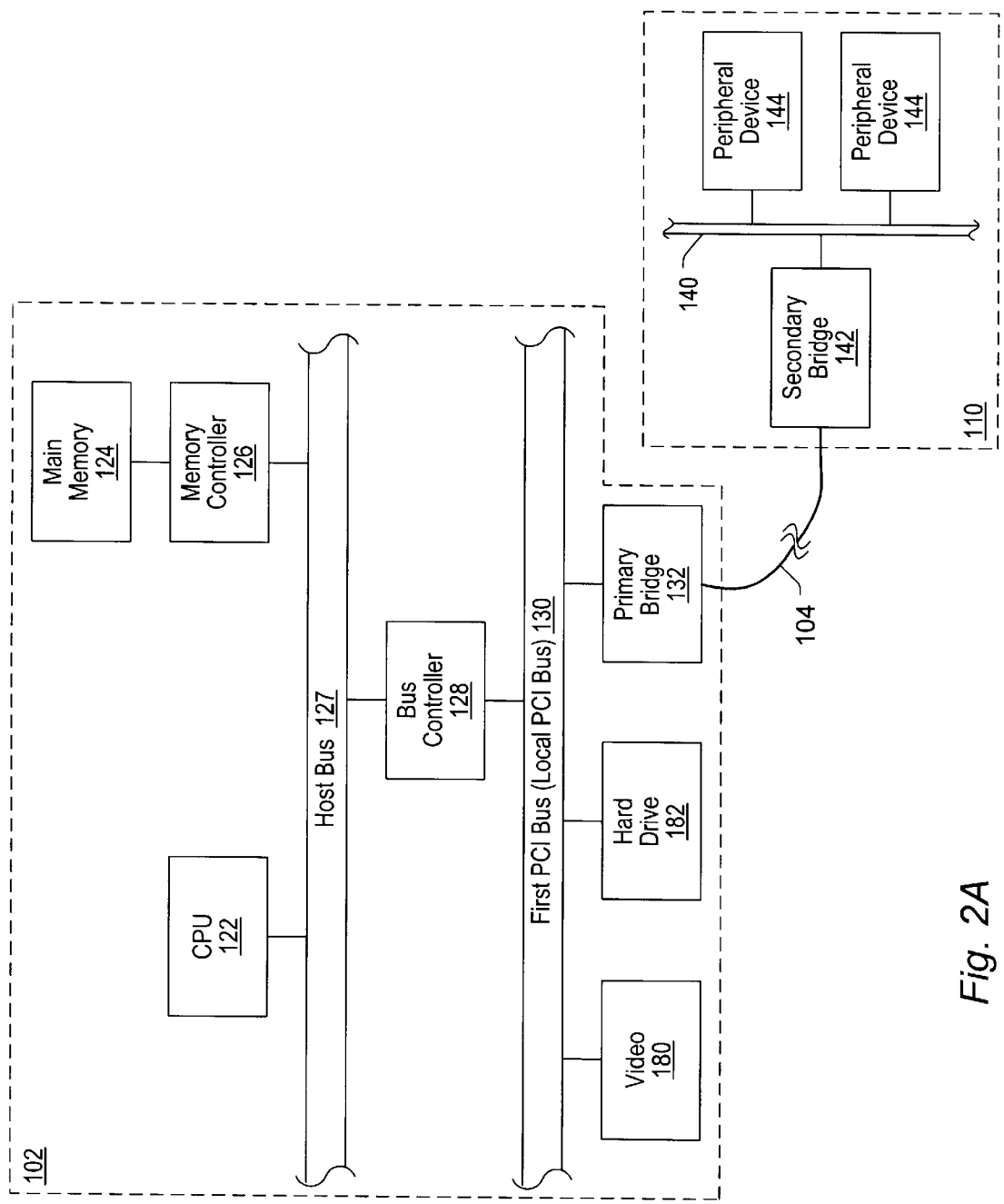
FIG. 2a is a block diagram of the system of FIG. 2.

As shown in FIG. 2A, the host computer system 102 includes a CPU 122 and memory 124, and also includes a first Peripheral Component Interconnect (PCI) bus 130. It is noted that the computer system 102 may have any of various system architectures. As shown in FIG. 2A, the CPU 122 couples to a host bus 127. The memory 124 couples through a memory controller 126 to the host bus 127. The computer includes chipset logic which implements a PCI bridge or bus controller 128. The bus controller couples to a first PCI bus 130, also referred to as the local PCI bus 130. Various devices may be connected to the PCI bus 130, such as a video or graphics card 180, a hard drive 182, or instrumentation devices. A primary bridge 132 according to the present invention is coupled to the first PCI bus 130. The primary bridge 132 includes PCI interface circuitry for interfacing to the first PCI bus 130.

The remote device 110 is located remotely from the computer system 102. The remote device 110 comprises a second or remote PCI bus 140 and one or more peripheral devices 144 coupled to the second PCI bus 140. The remote device 110 also includes a secondary bridge 142 coupled to the second PCI bus 140. The secondary bridge 142 includes PCI interface circuitry for interfacing to the second PCI bus 140. The serial bus 104 is coupled between the primary bridge 132 and the secondary bridge 142.

Each of the primary bridge 132 and secondary bridge 142 include parallel/serial transceivers for converting parallel data generated on the first PCI bus 130 and second PCI bus 140, respectively, to serial data for transmission on the serial bus 104 and for converting serial data received from the serial bus 104 to parallel data for generation on the first PCI bus 130 and second PCI bus 140, respectively. The primary bridge 132 and the secondary bridge 142 collectively implement a PCI—PCI bridge register set.

The primary bridge 132 and secondary bridge 142 are operable to transmit PCI bus cycles over the serial bus 104. The primary bridge 132 is operable to receive PCI cycles on the first PCI bus 130 and generate serial data on the serial bus 104 in response thereto, and the secondary bridge 142 is operable to receive the serial data from the serial bus 104 and generate corresponding PCI cycles on the second PCI bus 140. In a similar manner the secondary bridge 142 is operable to receive PCI cycles on the second PCI bus 140 and generate serial data on the serial bus 104 in response thereto, and the primary bridge 132 is operable to receive the serial data from the serial bus 104 and generate corresponding PCI cycles on the first PCI bus 130. In this manner, the CPU 122 in the host computer system 102 is operable to generate cycles on the first PCI bus 130 to communicate with peripheral devices coupled to the second PCI bus 140. Likewise, the peripheral devices in the remote device 110 coupled to the second or remote PCI bus 140 can generate cycles on the second PCI bus 140 to communicate with the CPU 122, memory 124 or other devices in the computer system 102.

Thus, according to the present invention, the CPU 122 is operable to generate cycles on the first PCI bus 130 to communicate with a peripheral device, wherein the peripheral device is coupled to either the first PCI bus 130 or the second PCI bus 140. In addition, software developed to communicate with a peripheral device coupled to the first PCI bus 130 of the host computer can also be used to communicate with the peripheral device regardless of whether the peripheral device is coupled to the first PCI bus 130 or the second PCI bus 140. Thus, to the CPU, the one or more peripheral devices coupled to the second PCI bus 140 appear coupled to the first PCI bus 130. Stated another way, the one or more peripheral devices coupled to the second PCI bus 140 are virtually coupled to said first PCI bus 130.

Each of the PCI buses or interfaces 130 and 140 preferably conforms to the Peripheral Component Interconnect Revision 2.1 Specification, which is hereby incorporated by reference in its entirety as though fully set forth herein. PCI specification states, "the PCI Local Bus is a high performance, 32-bit or 64-bit bus with multiplexed address and data lines. The PCI bus is intended for use as an interconnect mechanism between highly integrated peripheral controller components, peripheral add-in boards, and processor/memory systems." PCI bus operations are well known to those of ordinary skill in the art. However, basic PCI read and write cycles, or transactions, will be described here briefly for clarity. It is noted that the present invention may be used with future revisions of the PCI bus standard and/or other expansion bus standards, as desired. As used herein, the term "PCI bus" is intended to include the current PCI bus implementation, as well as future PCI bus implementations or revisions.

PCI bus read and write transactions occur between an initiator device, also referred to as a master, and a target device, also referred to as a slave. PCI bus read and write transactions include an address phase and one or more data phases. During the address phase, a valid address is supplied on the PCI bus address/data signals by the initiator of the transaction. The address specifies the source address of read transaction data or the destination address of write transaction data. During a data phase, the data to be read or written is transferred on the PCI bus address/data signals.

The initiator indicates the presence of valid data during a write transaction, or the reception of the data on a read transaction, via the IRDY# (initiator ready) signal. The target indicates the presence of valid data during a read transaction, or the reception of the data on a write transaction, via the TRDY# (target ready) signal. A data phase may comprise data transfer and wait state cycles. If a master or target is not ready to receive or supply data on a given bus clock cycle during data phase, it may insert wait states by deasserting the IRDY# or TRDY# signal, respectively.

The PCI specification also provides a means for a target to prematurely terminate a bus transaction by performing a target initiated termination, or disconnect. One of the prescribed target initiated termination means is referred to as a "retry" since it instructs the master to retry the bus transaction again.

Figure 3:
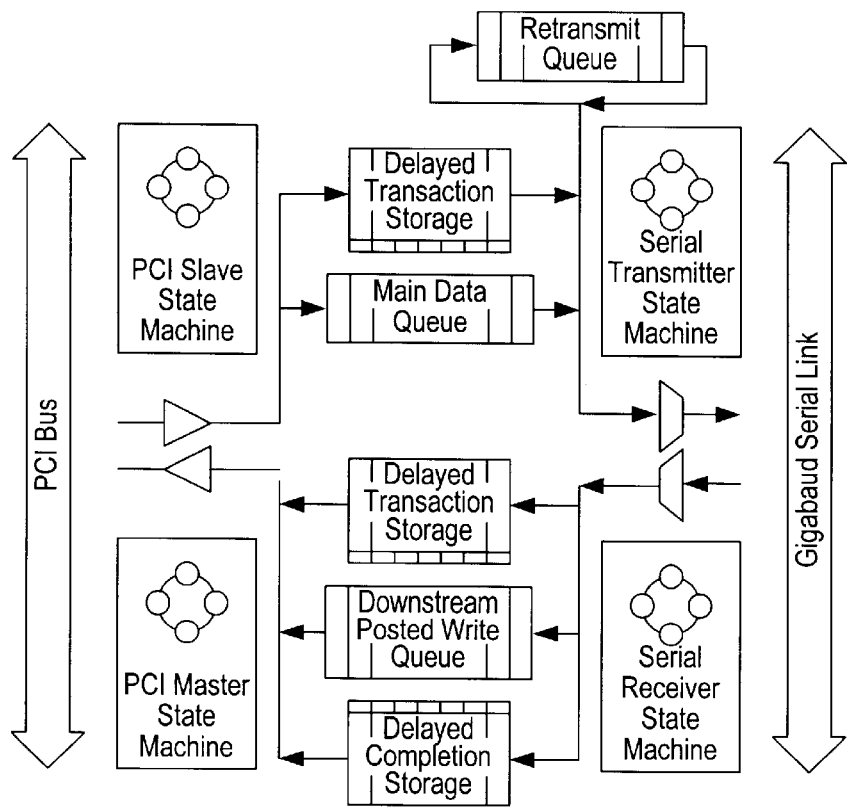
FIG. 3: shows a Block Diagram of a WASP bridge.

Block Diagram:

FIG. 3 is a block diagram that illustrates the internal architecture of the WASP, i.e., of each of the WASP bridges 132 and 142. In the present disclosure, the term "WASP" is used to refer to a WASP bridge, such as bridges 132 and 142. Shown in the diagram are four state machines, six transaction queues, and the interfaces to the PCI bus and to the parallel interface. The four state machines includes a PCI Slave State Machine, a PCI Master State Machine, a Serial Transmitter State Machine, and a Serial Receiver State Machine. The transaction queues include a retransmit queue, a delayed transaction storage queue, a data queue used on the PCI to serial portion, and a data queue used on the serial to PCI portion.

SYSTEM OPERATION

This portion of the application describes the operation of a WASP system, including the power on procedure, configuration, and general operation.

Modes

WASP operation requires two separate modes, primary and secondary. These two modes are determined by the state of the PRIMARY pin. When PRIMARY is high, the WASP is in primary mode and is placed upstream (closest to the host processor) in the PCIbus hierarchy. When PRIMARY is low, the WASP is in secondary mode and is placed downstream (farthest from the host processor). In this mode, it is also often the PCI system controller, providing clock and arbitration functions.

System Startup

After its power on reset input becomes high (deasserted), the WASP begins the issuing a sequence of packets called POP (Power On Packets) packets. These packets allow the two WASPs to synchronize the operation of their transmit and receive ports.

The secondary WASP generates POPA (Power On Packet Acknowledge) packets in response to the receipt of POP packets. The secondary WASP will continue to send POPA packets until it receives a packet other than POP or POPA. This should happen fairly soon after power on as the BIOS begins to configure the PCI interface presented by the primary WASP.

When the primary WASP receives the POPA packet, it asserts its internal BNO (begin normal operation) signal and allows its PCI port to begin accepting PCI cycles. Until BNO asserts, all PCI cycles decoded by the WASP will be retried.

This startup sequence provides two benefits to the WASP system. First, it allows the two sides of the WASP system to be powered up in any order. Second, it is also used to resynchronize the two WASPs in the event that power is lost and restored on either WASP.

Note that neither of these scenarios is foolproof. First, if the host processor is powered up long before the secondary WASP system and has a limit on the number of retries it will perform, the BIOS may determine that the primary WASP is a nonresponsive device because it has requested more retries than the host system will deliver. Second, if power is lost and restored on the secondary WASP, there are many configuration issues that will need to be resolved regarding the devices residing downstream of the WASP link.

Configuration

Once pci reset deasserts (becomes high), the host PC is free to begin configuring PCI devices. When it encounters the WASP, it will attempt to configure the WASP and any devices residing on PCI buses behind it. If the serial link is not operational, the primary WASP will reject all PCI cycles with a retry and will start a 16 second timer. Once that timer expires, the WASP's PCI port will only accept Type 0 configuration cycles. It will reject all other PCI cycles with a master abort. If the serial link becomes operational, it will begin the POP sequence and again allow PCI cycles of any type to occur.

The preferred power on sequence for the WASP system is to turn on devices farthest from the CPU first, and the CPU last. If this is done, all WASP serial links will be synchronized. If, for some reason, a user must provide power to a secondary device after providing power to the CPU, the timer gives that use 16 seconds to do so.

Transmission Count

Both the primary and the secondary WASPs maintain a count of the frames transmitted and received. All frames except those that are part of a Failure Acknowledge or Sanity Check generate a strobe that increments the transmission count.

This transmission count can then be used to detect if a frame was dropped and can also be used to instruct the initiator of the transfer that it must retransmit its information starting at a certain point.

WASP-WASP Communication

In many cases, the communication between the two WASPs does not involve the transfer of PCI data from one PCI bus to the other. These cases are discussed below.

Interrupts, SERR*, and PERR*

The secondary WASP monitors all four PCI interrupt lines, PERR*, and SERR*. When it detects a change in any of these lines, it creates a Type 0 Configuration cycle on the serial bus writing to the Interrupt Control Register or the Asynchronous Signal Register. After the primary WASP accepts this signal, it writes the data to the appropriate register. Depending on the status of enable bits in other registers, the primary WASP may assert the interrupts or other signals.

Transfer Acknowledgment and Sanity Checks

The WASPs must let each other know that transfers have been received successfully or must be retransmitted. Specific transfer types have been described specifically for this type of communication. They are described in the next section.

FIGS. 4–6

Figure 4:
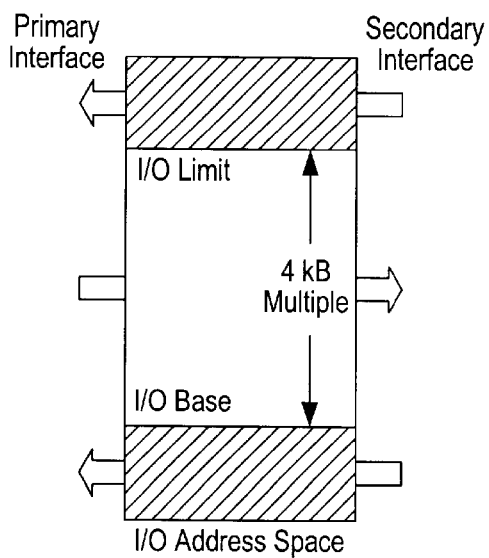
FIG. 4: illustrates the input/output Transaction Forwarding Map.

FIG. 4 illustrates the input/output Transaction Forwarding Map for the WASP, FIG. 5 illustrates the memory Transaction Forwarding Map for the WASP, and FIG. 6 illustrates the WASP Frame Format and Parity Generation.

SERIAL BUS OPERATION

The WASP can use various transmission protocols, including IEEE 1394, IEEE 1394.2, or other standard or proprietary protocols. In the preferred embodiment, the WASP system transfers information between two PCI buses using a high speed full duplex serial link as the transmission medium. Although this serial link increases the latency of the first piece of information transferred, the aggregate bit rate is fast enough to maintain sustained performance close to that achieved by the PCI bus.

The primary goal of the WASP serial protocol is achieving a high throughput. Second to this goal is limiting the first cycle latency of the link. Unfortunately, these two goals often conflict. A larger serial packet size usually increases overall throughput but also increases latency. The WASP protocol was designed to allow for high bandwidth transfers while limiting the first cycle latency. It does this with an efficient packet management scheme.

The Serial Packet

A WASP serial packet is a multi-byte entity consisting of at least three 40-bit frames. Each 40-bit frame is transmitted or received by the WASP as two 20-bit half-frames. These half frames each contain 16 bits of information about the transaction (command, address, or data) and 4 bits of parity.

The WASP uses the FLAG signal to differentiate between the upper and lower half-frames.

FIG. 8 illustrates the half-frame format and how the 4-bit parity field is generated.

Notice that two of the parity bits implement even parity while the other two implement odd parity. This prevents a long string of erroneous ones or zeroes from passing undetected through the parity check circuitry because it guarantees that every half-frame must have at least 2 ones and at least 2 zeroes.

A transfer comprises multiple packets that correspond to the individual elements of a PCI transaction. For example, a single DWORD PCI write appears on the serial bus as six frames (three packets), two for the command phase, two for the address, and two for the data. These six frames together comprise the transfer. A WASP transfer is analogous to the packet of most existing serial protocols.

This scheme allows a receiver to verify the integrity of a packet as each half-frame comes through the serial link instead of storing the entire packet and then determining if it was successfully received. The protocol makes no restrictions on the number of packets that can be concatenated. This means that large amounts of data can be transferred one-per-clock while small amounts of data do not waste bandwidth by requiring the creation of a larger packet to house them.

WASP Serial Protocol

The GLink transceivers inherently recognize three packet types: command, data, and fill. A command frame tells the receiver what type of information is contained in the following frames. Data frames usually PCI address and data information. Fill frames are inserted by the GLink transmitter when no Command or Data frames are being sent to ensure that the receiver is able to maintain a phase lock on the incoming serial stream.

Command Codes

Although the parallel interface of the GLink chips is 20 bits wide, the command half-frame only contains 18 bits of transmittable information (a limitation of the GLink chip). The WASP protocol requires that the four lower bits be used as the parity check; therefore, 14 bits are used to describe the impending transfer.

The table in FIG. 7 describes the various command frames that can be sent and received by the WASP.

Note that each frame contains command-specific information and information about the transmission count. The WASP uses the transmission count to ensure that each packet may be uniquely identified in case an error occurs. If an error occurs, the transmitter can be notified and will begin to retransmit the information beginning at the packet number (or transmission count) that had the error. The following sections will describe the various scenarios.

Posted Write Transactions

The transmitter uses code 1000 to indicate that the current transfer (which begins with a command frame) is a posted write. The PCI command will always indicate that the cycle is a memory write (MWI is converted to MW by the WASP).

For example, a PCI master initiates a memory write transaction at 0x8000 0000 with two DWords of data (0xDEAD BEEF and 0xABCD 1234). The following describes the sequence of 2 command half-frames and 6 data half-frames that would be sent (the parity information is excluded).

| CAV_n | xx00 | 1000 | 0111 | 0000 |
|-------|------|------|------|------|
| CAV_n | xx00 | 0000 | 0000 | 0000 |
| DAV_n | 1000 | 0000 | 0000 | 0000 |
| DAV_n | 0000 | 0000 | 0000 | 0000 |
| DAV_n | 1101 | 1110 | 1010 | 1101 |
| DAV_n | 1011 | 1110 | 1110 | 1111 |
| DAV_n | 0101 | 1011 | 1100 | 1101 |
| DAV_n | 0001 | 0010 | 0011 | 0100 |

The first column indicates whether CAV_n or DAV_n is asserted, informing the GLink chip whether a Control or a Data word is available. The next four columns contain the half-frame information to be transferred. Note that the half-frames must be transmitted on adjacent clock edges. If there is a gap, the WASP assumes the transfer is complete and will expect the next packet sent to be a command packet. The assumption here is that if a packet is somehow dropped, the WASP will see an empty clock cycle. The next valid packet will tell the WASP that an error occurred.

The receiving WASP increments its frame count as each frame is accepted. After receiving this transfer, that counter will have a value of 4. The frame count of the next command frame should also be 4. If it is not, then at least one frame was lost.

PCI Configuration Transactions

The transmitter uses code 1001 to indicate that the current transfer is a PCI configuration write accepted by the primary WASP. The primary WASP passes all write accesses to its configuration registers to the secondary WASP so that the two WASPs have identical copies of the register values.

The WASP does not mirror every bit of every register. The register descriptions list which bits are accepted and changed when a serial Type 0 Configuration transfer is received. Because the WASPs automatically update each other's registers, it is not necessary to transmit Type 0 configuration reads over the serial link. All reads of the WASP occur on the primary bus and are serviced by the primary WASP.

Delayed Request Transactions

The transmitter uses codes 1100, 1101, 1110 to indicate that the current packet is a delayed request transaction that must be completed on the other PCI bus. Status from that cycle must then be returned via a delayed completion transaction (code 1111). The three codes correspond to the three delayed transaction channels of the WASP.

Delayed Completion Transactions

The transmitter uses code 1111 to indicate that the current packet is a delayed completion. A delayed completion returns data and/or status for a PCI cycle back to the PCI bus originating the transaction.

The status of a delayed completion is returned in the first data frame of the packet. The remaining data frames contain PCI data. In addition to status, the first data frame also describes which delayed transaction channel is being serviced. Bits 2-0 indicate which channel is being serviced. Bit 3 is set if the transaction was successful. Bit 4 is set if the transaction received a master abort. Bit 5 is set if the transaction received a target abort.

Although parity errors can also occur, they are passed back in the ParErr bit of the command frame.

When the WASP receives a delayed completion packet with the target abort bit set, it returns a target abort when the PCI master retries the cycle. If the WASP receives a delayed completion packet with the master abort bit set, it will either return 0xffff_ffff or target abort, depending on the state of the Master Abort Mode bit in the Bridge Control Register.

Success Acknowledge Transactions

The transmitter uses code 0001 to indicate that the current transfer is a success acknowledge packet.

The ACK packet actually has two purposes. It tells the transmitter about the status of the receiver's Downstream Queue (the queue of posted writes and delayed transactions waiting for the master state machine to issue them to the PCI bus). It also tells the transmitter what the latest frame count is, allowing the transmitter to flush its retransmit queue up to that point.

The following describes the two command half-frames and four data half-frames of a sample Success Acknowledge transfer.

| CAV_n | xx00 | 0001 | 0000 | 0100 |
|---|---|---|---|---|
| CAV_n | xx00 | 0000 | 0000 | 0000 |
| DAV_n | 0000 | 0000 | 0000 | 0000 |
| DAV_n | 0000 | 0000 | 0000 | 1000 |
| DAV_n | 0000 | 0000 | 0000 | 0000 |
| DAV_n | 0000 | 0000 | 0001 | 1110 |

The control frame indicates Success Acknowledge. The first two data half-frames comprise the first data frame. They contain an 8, indicating that the WASP sending the Success Acknowledge has consumed 8 elements from the Downstream Queue since the last Success Acknowledge was sent. This allows the transmitter of the other WASP to decrement its DQ tracking counter by 8, allowing 8 more elements to be transmitted.

The second two data half-frames comprise the frame count. The value of 0x1e indicates that the packet count of the last successfully received frame was 0x1e. The WASP receiving the Success Acknowledge can flush its retransmit queue until the frame corresponding to 0x1e is removed.

Failure Acknowledge Transactions

The transmitter uses code 0010 to indicate that the current transfer is a Failure Acknowledge.

The Failure Acknowledge is essentially a retransmit request. It is similar to the Success Acknowledge transfer. An example of a Failure Acknowledge is shown below.

| CAV_n | xx00 | 0010 | 0000 | 0010 |
|---|---|---|---|---|
| CAV_n | xx00 | 0000 | 0000 | 0000 |
| DAV_n | 0000 | 0000 | 0000 | 0000 |
| DAV_n | 0000 | 0000 | 0000 | 0000 |
| DAV_n | 0000 | 0000 | 0000 | 0000 |
| DAV_n | 0000 | 0000 | 0000 | 1000 |

The control packet indicates Failure Acknowledge. The first two data half-frames indicate the frame count; however, this information is not used. The second two data half-frames contain the packet count of the bad packet, also known as the retransmission point.

On receipt of a Failure Acknowledge transfer, the WASP must stop transmitting as soon as possible and flush its retransmit queue until its own transmission counter equals the retransmission point. The transmitter then begins to retransmit the information from there.

Additionally, the receipt of a Failure Acknowledge implies that all transfers sent from the retransmit point on were not accepted at the receiver. Instead of forcing the WASP to perform complicated arithmetic on the DQ Tracking Counter (the counter that tracks the Downstream Queue of the other WASP), the error recovery protocol dictates that the WASP wait until all data from the Downstream Queue has been consumed by the PCI Master State Machine. At that point it sends the retransmit request. When the first WASP receives the Failure Acknowledge, it then resets its DQ Tracking Counter to indicate that the target WASP's downstream queue is empty.

Although a frame count is sent with each Failure Acknowledge, the Failure Acknowledge itself does not cause the receiver's frame counter to increment. Also, the WASP sending the Failure Acknowledge does not submit the Failure Acknowledge transfer to its own retransmit queue. These measures are taken to accommodate the possibility that the Failure Acknowledge itself could become corrupted in transit.

The circuitry that determines when to send a Failure Acknowledge transfer has its own timer that begins counting when the Failure Acknowledge is sent. The requested retransmission must occur before the timer expires or the Failure Acknowledge will be sent again. Because the WASP receiving a Failure ACK essentially shuts down normal operation to begin retransmission, the length of time between the transmission of a Failure Acknowledge and the receipt of the first packet of the retransmission is deterministic for a given cable length.

Table 8 describes the error conditions that can occur and whether or not WASP will return a Failure Acknowledge.

Although more error conditions exist than are listed in the table, all error conditions break down into one of the categories listed. For example, the table does not specifically list the assertion of the ERROR signal from the GLink chips; however, because the WASP ignores the current packet when this occurs, the problem would manifest itself as either the receipt of a data packet after a fill frame or as a non matching packet count.

Reset Transactions

The transmitter uses code 0011 to indicate that the current transfer is a reset. This transfer is generated when the PCI reset line asserts and deasserts. Bit 0 of the first data frame indicates whether this is a reset assertion or a reset deassertion.

Because PCI reset is received by the primary WASP and is generated by the secondary WASP, the Reset Transaction is only sent from primary to secondary.

Additionally, at power-up, the primary WASP does not send a packet instructing the secondary WASP to assert PCI reset. The secondary WASP automatically drives PCI reset while Power-On reset is asserted.

Sanity Check Transactions

The transmitter uses code 0010 to indicate that the current transfer is a sanity check.

The sanity check is a method of providing an overall error checking umbrella that can catch the error patterns that the 4 bit parity might miss. The Sanity CRC is a running CRC calculated on the information sent across the serial link, instead of being an autonomous CRC that is only calculated on a single frame. When the receiver gets a sanity check packet, it verifies that the Sanity CRC matches its own Sanity CRC. If it does, operation continues as normal. If it does not, then both the primary and secondary WASPs assert SERR_n and system operation halts.

Like the Failure Acknowledge, the command and data packets of the Sanity Check do not cause the packet count to be incremented. Also, a Sanity Check is not submitted into the retransmit when it is transmitted over the serial link. If an error occurs on a Sanity Check, the receiver ignores the transfer. Failure Acknowledge packets are not issued based on an error caused by a faulty Sanity Check transfer.

Finally, neither the Failure Acknowledge packet nor the Sanity Check packet are used in calculating the running CRC value. Furthermore, the Failure Acknowledge causes the running CRC to be reset because a missed packet or other error would have caused the CRC calculated at the transmitter to differ from that calculated at the receiver.

Error Detection and Correction

The WASP maintains several methods of error detection and provides a means to correct most errors when they are detected. When the receiving WASP detects an error, it issues a Failure Acknowledge back to the transmitting WASP. If the error occurred in the middle of the payload of a large packet, the receiving WASP will have already accepted the first part of the packet and, in fact, the PCI master state machine may have already begun consuming it. A Failure Acknowledge, therefore, is a request to start a new transfer beginning at the point where the error occurred. The transmitting WASP must issue a new command packet (with the packet count expected by the receiving WASP), a new data packet with the updated PCI address, and data packets beginning with the one causing the error.

On detecting the error and submitting a retransmission request, the receiving WASP will no longer accept packets until it receives a command packet with the same transmit count as requested by the Failure ACK.

The error detection methods are described in the following subsections.

Parity

A 4 bit parity word is generated for each frame—frame. Each of the 4 bits corresponds to one bit of each nibble of the other 16 bits of the half-frame. When a receiver detects a parity error, it discards that packet and sends a message back to have the source retransmit the information beginning at the invalid frame. The 4 bit parity field in each half-frame is designed to detect all of the expected error modes of a serial system; however, like all CRC and parity check mechanisms, it can not detect 100% of all errors.

Packet count

By keeping a running tally of the number of frames sent, the WASP can detect if a frame was dropped. The start of every transfer begins with a command frame that includes the frame's count. If the receiver's frame count does not match that received, it can ask for a retransmission beginning at the missing frame.

Packet Monitoring

The WASP expects every packet to begin with a command frame and to complete the entire transfer on consecutive clocks. If a fill frame ever directly precedes a data frame, then either a command frame was dropped or one of the data frame in the middle of a transfer was dropped. The WASP cannot distinguish between the two.

In this situation, the WASP does not request retransmission. The WASP cannot tell what type of transfer is occurring based on a missing or corrupted command packet. Because it would be undesirable for the WASP to transmit a Failure Acknowledge based on a bad Failure Acknowledge, the WASP cannot ask for retransmission until it receives the next command frame.

The WASP simply discards the remaining data frames without incrementing its frame counter. When the next valid command packet appears at the receiver, the WASP will be able to take action because this command packet will contain the current packet count and will therefore let the WASP know whether or not it missed vital information.

If the transfer that erred (had a missing packet or a corrupted command packet) was a Failure Acknowledge and the new transfer is a Failure Acknowledge, the WASP will not see a discrepancy in the packet count because neither the erring transfer nor the new one causes the frame count to increment. The WASP can respond to the new transfer as if no error ever occurred.

If the first transfer after an erred Failure Acknowledge is not another Failure Acknowledge, then the receiving WASP will not see any error because the packet count will match the expected value. The WASP that sent the Failure Acknowledge will eventually retransmit it because it will not receive the expected retransmission before its timer expires.

If the transfer that erred was a Sanity Check, the WASP will also not see any discrepancy in the packet count of the new transfer. Like Failure Acknowledge, Sanity Checks do not cause the packet count to be incremented. Because Sanity Checks do not carry vital information, they may be safely ignored. Any transfer following a failed Sanity Check may be processed normally.

If the transfer that erred was any other type of transfer, the next command packet will include a packet count that does not match the expected value. The WASP may then submit a Failure Acknowledge to request retransmission. At this point, it will ignore further transfers until retransmission begins.

Note: Failure Acknowledge packets are never ignored. This will prevent a deadlock where each WASP is ignoring the other's Failure Acknowledges.

Command Code Errors

The GLink chips can detect if they receive an invalid control code with each frame. This control code is what tells the GLink receiver that the packet is a command or data packet. When the GLink chip receives an invalid control code, it will assert its ERROR signal. The WASP will ignore that particular packet (treating it like a fill frame). When the next packet comes, it may either be a command packet or a data packet. In either case, this situation becomes treated the same as the Packet Monitoring above.

Synchronization Loss

If the WASP detects that the GLink chips have lost synchronization, it will wait until sync is reestablished. When the next packet arrives, the WASP will be able to tell if it missed any information by comparing the packet counter value to the received packet count. If the values do not match, the WASP will issue a Failure ACK.

If synchronization loss persists, the WASP will enter a shutdown mode. As soon as the WASP detects that the serial link is not working, it begins a 2 second timer. While that timer is counting, the PCI slave state machine will reject all cycles with a retry. If the timer expires and the serial link is still not operating, the WASP will only respond to Type 0 configuration cycles. In other words, it will allow its registers to be read and written, but will not respond to any other cycles, causing those cycles to end with a master abort.

Running CRC

Although the likelihood of an erroneous packet being accepted as valid is very small, the WASP implements a second level of detection to improve coverage. Both the transmitting and receiving WASP maintain running CRCs based on information sent or received. Periodically, the transmitting WASP will send a Sanity Check transfer. This transfer contains the CRC calculated by the transmitter. The receiving WASP compares this value with its own CRC. If the values do not match, an error condition has occurred and the system must be halted (by asserting SERR_n).

Note that if an error is detected via any of the correctable methods listed above, that virtually guarantees an error would be detected by the running CRC; however, because the detection of errors causes the WASP to stop accepting packets (except for Failure Acknowledge transfers), the Sanity Check packet would also be ignored. Sanity Check packets are only accepted and analyzed when the system seems to be operating normally; therefore, an error detected by an invalid sanity CRC automatically indicates that an undetected error occurred. Asserting SERR_n then halts the system.

When a Failure Acknowledge is transmitted, the WASP sending the Failure Acknowledge resets its transmit CRC. The WASP receiving the Failure Acknowledge resets its receive CRC. This ensures that when retransmission occurs, the two copies of the CRC will track.

In addition, because Sanity Checks and Failure Acknowledges are ignored when an error occurs within them, they do not cause the running CRC to change when they are submitted.

EXAMPLES
Memory Reads and Writes

Assume the following sequence of events occurs on the primary PCI bus:

Memory Write, Address=0×8000_0000, Data 1=0× DEAD_BEEF, Data2=0×ABCD_1234

Memory Write, Address=0×8000_0008, Data 1=0× AAAA_5555

Memory Read, Address=0×8000_0008

Memory Write, Address=0×8000_0008, Data 1=0× 9876_5432

The primary WASP inserts three entries into its Upstream Queue (UQ) in response to the first transaction listed above. The UQ now looks like this:

7 8000_0000←head
0 DEAD_BEEF
0 ABCD_1234
(empty)←tail

As soon as the first entry is made, the WASP prepares to issue a serial packet by creating the first frame of the transfer. The WASP creates this frame using the code for a posted write, the PCI command code, the byte enables, and the current frame count, which right now is 0000. It then creates additional frames corresponding to the elements of the PCI transaction, i.e. one address frame and two data frame. Based on the first entry in the UQ, the serial transfer has the following form (note that the parity bits have been removed from each frame for simplicity)

0870_0000 8000_0000 DEAD_BEEF

As the WASP sends the first frame (0870 0000) it is preparing the next one which contains the address (8000 0000). As it sends the address, it prepares the first data word. During this time, it is also looking at the next entry in the UQ to see if it continues the data stream or if it begins a new transfer. Because it is, the next DWord is also added to the packet. As transmitted, the packet is now:

0870_0000 8000_0000 DEAD_BEEF ABCD_1234

Assume now that the next PCI transaction has been accepted by the WASP before the UQ has emptied completely. The UQ now looks as follows:

7 8000_0004←head
0 ABCD_1234
7 8000_0008
0 AAAA_5555
(empty)←tail

Although the address of the new PCI transaction continues where the last PCI write left off, the WASP begins a new cycle. It does not combine multiple PCI writes into a single packet. A new serial transfer begins.

0870_0000 8000_0000 DEAD_BEEF ABCD_1234
0870_0004 8000_0008 AAAA_5555

As each packet is created, it is routed to both the Retransmit Queue and to the parallel interface for transmission over the serial link. As each is submitted, the packet count is incremented. Also, each packet submission causes the running CRC to be updated. The reset value of the CRC is a first value. As the first packet is sent, the CRC becomes a different value Finally, each posted write data element sent causes the Downstream Queue Tracking Counter to increment by 1.

Next, the WASP accepts the PCI Memory Read. The WASP captures the command, byte enables, and address and then issues a retry to the PCI initiator. It puts the cycle information into its Delayed Transaction Storage and into the UQ. Both read requests and write data are placed in the same queue to maintain order of operations.

This read request is transmitted in a delayed request packet as follows:

0C60_0007 8000_0008 0000_0006

The first frame indicates that this is a delayed request packet. The second frame indicates that the address is 80000008. The third frame indicates that 6 DWords should be prefetched by the PCI master state machine of the other WASP.

The final PCI write now occurs. Again, the information is accepted into the UQ and is then transmitted as follows:

0870_000A 8000_0008 9876_5432

Note that the packet count is A, accounting for the ten packets already sent, numbered 0 through 9. The complete sequence of packets is shown below.

0870_0000 8000_0000 DEAD_BEEF ABCD_1234
0870_0004 8000_0008 AAAA_5555
0C60_0007 8000_0008 0000_0006
0870_000A 8000_0008 9876_5432

The WASP just accepted three PCI accesses to the same PCI address in the order of Write, Read, Write. It submitted these accesses in the same order; however, this ordering does not guarantee the order of the completion of the corresponding PCI cycles. The first two PCI writes will occur and must complete before the PCI read may occur. That read, however, may be retried. While retrying that read, the WASP master state machine may choose to issue the last posted write before completing the read. If all of these transactions had been initiated by the same master, then there could not be a guarantee that any software written would be able to preserve the order of reads and writes that it submits. Once a PCI master receives a retry, however, as in the case of the Memory Read above, that master must retry the access until the access completes before submitting another transaction if that master needs to ensure the order of its operations. Because we saw the final Memory Write issued before the Memory Read completed, that Write must have come from another PCI master. Thus, there is no problem with the transactions being rearranged as they were in this example.

Retransmission

Assume that the second frame of the first packet in the above example (frame count=1) had one of its bits changed from 1 to 0 and this fact was detected by the receiver of the secondary WASP. In other words, the transmitting WASP (in this case, the primary WASP) sent 0x8000_0000 and the receiving WASP (in this case, the secondary WASP) received 0x0000_0000. The secondary WASP has accepted and decoded the command frame and knows that the packet coming over the serial link is a Posted Memory Write. It has received an error in the packet that contains the PCI address, however, and must signal that fact to the primary WASP. It must also discard the command packet it received because it does not have enough information to make a PCI cycle.

Once the secondary WASP has detected the error, it stops the regular acceptance and processing of packets coming from the primary WASP. If there is data in its DQ, the secondary WASP waits until that data has been consumed by the PCI Master State machine. The secondary WASP then prepares and sends a Failure Acknowledge back to the primary WASP. Waiting for the secondary WASP's DQ to empty allows the primary WASP to clear its DQ Tracking Counter when it receives the Failure Acknowledge from the secondary WASP. The Failed ACK transfer is made of the following three frames:

0010_0000 0000_0001 0000_0000

The first half-frame (0010) indicates that this is a Failure Acknowledge transfer. The second half-frame is the packet count of the transmitter of the secondary WASP. Since the secondary WASP has not submitted anything yet, its packet count is 0. The second frame provides the retransmit point.

When the primary WASP receives the Failure Acknowledge transfer, it stops transmitting over the serial bus. It will then begin a process that pulls the information from the Retransmit Queue and retransmits it over the serial link, beginning with a frame count of 1. Notice that the primary WASP must still send a command packet first. If this time all packets are transmitted successfully, then the following sequence should be received at the secondary WASP. Notice that the only difference is the frame count.

0870_0001 8000_0000 DEAD_BEEF ABCD_1234

0870_0005 8000_0008 AAAA_5555

0C60_0008 8000_0008 0000_0006

0870_000B 8000_0008 9876_5432

The circuitry that empties the RTQ must keep track of several pieces of information about the frame at the head of the RTQ. This frame may be a command frame, a data frame that contains a PCI address, or a data frame that contains PCI data. The RTQ itself is actually 34 bits wide, so bits 33 and 32 are used to provide a 2 bit code that tell the WASP what type of packet is in the RTQ. Table 9 describes how the 34 bit RTQ word is interpreted.

When the WASP clocks out and discards a command or address frame from the RTQ, it stores the contents of that frame. Each time the WASP clocks out and discards a PCI data frame, it increments the stored PCI address. If the frame at the head of the RTQ is a data frame and was part of a posted write transaction, then the stored command and PCI Address correspond to the command and PCI address of that frame.

Once the WASP receives the Failure Acknowledge and has ceased normal serial transmission, it clears the DQ Tracking Counter. It then begins to clock packets out of the RTQ.

Each time a packet is clocked out of the RTQ, the RTQ Packet Counter is incremented. This counter is compared with the Retransmit Point provided by the Failure Acknowledge. When they match, the WASP continues to clock data out of the RTQ; however, at this point, instead of discarding that data, the WASP creates serial transfers from it. This point in the RTQ is also stored. This will allow the WASP to return to this data should retransmission again be necessary.

Once the WASP begins to read elements from the RTQ, one of two events can happen. Either the WASP will finish reading the RTQ, or it will receive another Failure Acknowledge, indicating that one of the retransmitted packets had an error. When either of these events occurs, the WASP resets the RTQ so that the element at the head of the queue is the marked element. It also resets the RTQ Packet Counter to the value it had before retransmission started (This should correspond to the Retransmit Point as indicated by the original Failure Acknowledge).

The WASP can then begin processing the new Failure Acknowledge just as it did the original one. It clocks out and discards RTQ information until the RTQ Packet Counter equals the new Retransmit Point provided by the Failure Acknowledge just received.

In our example, the WASP RTQ Frame Counter was at 0 and the WASP received a Failure Acknowledge with a Retransmit Point of 0x0001. The WASP will read out the first element in the RTQ. Because this element is a command frame, this information is stored. At this point, the RTQ Frame Counter and the Retransmit Point match. The WASP starts a new packet, using the stored command frame as the first frame, but this time the packet count is 1.

The WASP marks the head element in the RTQ and begins to read the RTQ. It clocks out the address, 0x8000_0000, and the data elements (0xDEAD_BEEF, 0xABCD_1234). The serial transfer sent is identical to the original transfer except for the frame count.

0870_0001 8000_0000 DEAD_BEEF ABCD_1234

The succeeding packets are sent similarly.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A system for coupling one or more peripheral devices to a computer, comprising:

a computer system, wherein the computer system includes a CPU and memory, wherein the computer system includes:

a first Peripheral Component Interconnect (PCI) bus; and a first interface coupled to the first PCI bus, wherein the first interface includes PCI interface circuitry for interfacing to the first PCI bus;

a remote device located remotely from the computer system, the remote device comprising:

a second PCI bus;

one or more peripheral devices coupled to the second PCI bus; and a second interface coupled to the second PCI bus, wherein the second interface includes PCI interface circuitry for interfacing to the second PCI bus;

a serial bus coupled between the first interface and the second interface, wherein the serial bus includes first and second ends, wherein the first end of the serial bus is coupled to the first interface and the second end of the serial bus is coupled to the second interface;

wherein each of the first interface and the second interface include parallel/serial transceivers for converting parallel data generated on the first PCI bus and second PCI bus, respectively, to serial data for transmission on the serial bus and for converting serial data received from the serial bus to parallel data for generation on the first PCI bus and second PCI bus, respectively;

wherein the first interface and the second interface operate as a single PCI—PCI bridge;

wherein the first interface operates as a first portion of a PCI—PCI bridge, and wherein the second interface operates as a second portion of the PCI—PCI bridge.

2. The system of claim 1, wherein the first interface and the second interface are operable to transmit PCI bus cycles over the serial bus.

3. The system of claim 1, wherein the first interface is operable to receive first PCI cycles on the first PCI bus and generate first serial data on the serial bus in response thereto;

wherein the second interface is operable to receive the first serial data from the serial bus and generate second PCI cycles on the second PCI bus.

4. The system of claim 3, wherein the second interface is operable to receive third PCI cycles on the second PCI bus and generate second serial data on the serial bus in response thereto;

wherein the first interface is operable to receive the second serial data from the serial bus and generate fourth PCI cycles on the first PCI bus.

5. The system of claim 1, wherein the CPU in the computer system is operable to generate cycles on the first PCI bus to communicate with the one or more peripheral devices coupled to the second PCI bus.

6. The system of claim 1, wherein the CPU is operable to generate cycles on the first PCI bus to communicate with a peripheral device, wherein the peripheral device is coupled to either the first PCI bus or the second PCI bus.

7. The system of claim 1, wherein the memory of the computer system stores software, wherein the software is executable to communicate with a peripheral device coupled to either the first PCI bus or the second PCI bus.

8. The system of claim 1, wherein the memory of the computer system stores software, wherein the software was developed to communicate with a first peripheral device coupled to the first PCI bus of the host computer;

wherein the software is executable to communicate with the first peripheral device coupled to either the first PCI bus or the second PCI bus.

9. The system of claim 1, wherein, to the CPU, the one or more peripheral devices coupled to the second PCI bus appear coupled to the first PCI bus.

10. The system of claim 1, wherein the one or more peripheral devices coupled to the second PCI bus are virtually coupled to the first PCI bus.

11. The system of claim 1, wherein the serial bus has a length greater than one meter.

12. The system of claim 1, wherein the serial bus has a length that ranges from 2 meters to 2 kilometers.

13. The system of claim 1, wherein the computer system has a first mechanical form factor, wherein the remote device has a second mechanical form factor, wherein the second mechanical form factor is different than the first mechanical form factor.

14. The system of claim 1, wherein the second mechanical form factor is a more rugged mechanical form factor than the first mechanical factor.

15. The system of claim 1, wherein the first interface, the second interface, and the serial bus collectively implement a PCI—PCI bridge.

16. The system of claim 1, wherein the first interface and the second interface collectively implement a PCI—PCI bridge register set.

17. A system for coupling peripheral devices to a computer, comprising:

a computer system, wherein the computer system includes a CPU and memory, wherein the computer system includes:
a first bus; and
a first interface coupled to the first bus, wherein the first interface includes first bus interface circuitry for interfacing to the first bus;

a remote device located remotely from the computer system, the remote device comprising:
a second bus;
one or more devices coupled to the second bus; and
a second interface coupled to the second bus, wherein the second interface includes second bus interface circuitry for interfacing to the second bus;

a serial bus coupled between the first interface and the second interface, wherein the serial bus includes first and second ends, wherein the first end of the serial bus is coupled to the first interface and the second end of the serial bus is coupled to the second interface;

wherein each of the first interface and the second interface include parallel/serial transceivers for converting parallel data generated on the first bus and second bus, respectively, to serial data for transmission on the serial bus and for converting serial data received from the serial bus to parallel data for generation on the first bus and second bus, respectively;

wherein the first interface and the second interface operate as a single bridge;

wherein the first interface operates as a first portion of a PCI—PCI bridge, and wherein the second interface operates as a second portion of the PCI—PCI bridge.

18. The system of claim 17, wherein the first interface and the second interface are operable to transmit first and second bus cycles over the serial bus.

19. The system of claim 17, wherein the first interface is operable to receive first cycles on the first bus and generate first serial data on the serial bus in response thereto;

wherein the second interface is operable to receive the first serial data from the serial bus and generate second cycles on the second bus.

20. The system of claim 19, wherein the second interface is operable to receive third cycles on the second bus and generate second serial data on the serial bus in response thereto;

wherein the first interface is operable to receive the second serial data from the serial bus and generate fourth cycles on the first bus.

21. The system of claim 17, wherein the CPU in the computer system is operable to generate cycles on the first bus to communicate with the one or more devices coupled to the second bus.

22. The system of claim 17, wherein the memory of the computer system stores software, wherein the software was developed to communicate with a first device coupled to the first bus of the host computer;

wherein the software is executable to communicate with the first device coupled to either the first bus or the second bus.

23. The system of claim 17, wherein the serial bus has a length greater than one meter.

24. The system of claim 17, wherein the serial bus has a length that ranges from 2 meters to 2 kilometers.

25. The system of claim 17, wherein the computer system has a first mechanical form factor, wherein the remote device has a second mechanical form factor, wherein the second mechanical form factor is different than the first mechanical form factor.

26. The system of claim 25, wherein the second mechanical form factor is a more rugged mechanical form factor than the first mechanical factor.

27. The system of claim 17, wherein the first interface, the second interface, and the serial bus collectively implement the single bridge.

28. The system of claim 17, wherein the first interface and the second interface collectively implement a single bridge register set of the single bridge.

29. The system of claim 17, wherein the first interface operates as a first portion of the bridge, and wherein the second interface operates as a second portion of the bridge.

30. The system of claim 17, wherein the first bus is a Peripheral Component Interconnect (PCI) bus.

31. The system of claim 17, wherein the second bus is a Peripheral Component Interconnect (PCI) bus.

32. The system of claim 17, wherein the first bus is a Peripheral Component Interconnect (PCI) bus, and wherein the second bus is a PCI bus;
   wherein the single bridge is a PCI—PCI bridge;
   wherein the first interface, the second interface, and the serial bus collectively implement the PCI—PCI bridge.

33. The system of claim 32, wherein the first interface and the second interface collectively implement the PCI—PCI bridge register set.

34. A bridge for expanding access over a first bus to a second bus, the bridge comprising:
   a first interface operable to couple to a first PCI bus, wherein the first interface includes PCI interface circuitry for interfacing to the first PCI bus, wherein the first interface further includes a serial interface for interfacing to a serial bus;
   a second interface operable to couple to a second PCI bus, wherein the second interface includes PCI interface circuitry for interfacing to the second PCI bus, wherein the second interface further includes a serial interface for interfacing to the serial bus, wherein the second interface is located remotely from the first interface; and
   the serial bus coupled between the first interface and the second interface, wherein the serial bus includes first and second ends, wherein the first end of the serial bus is coupled to the first interface and the second end of the serial bus is coupled to the second interface;
   wherein each of the first interface and the second interface include parallel/serial transceivers for converting parallel data generated on the first PCI bus and second PCI bus, respectively, to serial data for transmission on the serial bus and for converting serial data received from the serial bus to parallel data for generation on the first PCI bus and second PCI bus, respectively;
   wherein the first interface and the second interface operate as a single PCI—PCI bridge;
   wherein the first interface operates as a first portion of a PCI—PCI bridge, and wherein the second interface operates as a second portion of the PCI—PCI bridge.

35. The bridge of claim 34, wherein the first interface and the second interface are operable to transmit PCI bus cycles over the serial bus.

36. The bridge of claim 34, wherein the first interface is operable to receive first PCI cycles on the first PCI bus and generate first serial data on the serial bus in response thereto;
   wherein the second interface is operable to receive the first serial data from the serial bus and generate second PCI cycles on the second PCI bus.

37. The bridge of claim 36, wherein the second interface is operable to receive third PCI cycles on the second PCI bus and generate second serial data on the serial bus in response thereto;
   wherein the first interface is operable to receive the second serial data from the serial bus and generate fourth PCI cycles on the first PCI bus.

38. The bridge of claim 34, wherein the serial bus has a length greater than one meter;
   wherein the second interface is located greater than one meter from the first interface.

39. The system of claim 34, wherein the serial bus has a length that ranges from 2 meters to 2 kilometers;
   wherein the second interface is located between 2 meters and 2 kilometers from the first interface.

40. The bridge of claim 34, wherein the first interface, the second interface, and the serial bus collectively implement the single PCI—PCI bridge.

41. The bridge of claim 34, wherein the first interface and the second interface collectively implement a PCI—PCI bridge register set for the single PCI—PCI bridge.

42. A bridge for expanding access over a first bus to a second bus, the bridge comprising:
   a first interface operable to couple to a first bus, wherein the first interface includes first bus interface circuitry for interfacing to the first bus, wherein the first interface further includes a serial interface for interfacing to a serial bus;
   a second interface operable to couple to a second bus, wherein the second interface includes second bus interface circuitry for interfacing to the second bus, wherein the second interface further includes a serial interface for interfacing to the serial bus, wherein the second interface is located remotely from the first interface; and
   the serial bus coupled between the first interface and the second interface, wherein the serial bus includes first and second ends, wherein the first end of the serial bus is coupled to the first interface and the second end of the serial bus is coupled to the second interface;
   wherein each of the first interface and the second interface include parallel/serial transceivers for converting parallel data generated on the first bus and second bus, respectively, to serial data for transmission on the serial bus and for converting serial data received from the serial bus to parallel data for generation on the first bus and second bus, respectively;
   wherein the first interface and the second interface operate as a single bridge;
   wherein the first interface operates as a first portion of a bridge, and wherein the second interface operates as a second portion of the bridge.

43. The bridge of claim 42, wherein the first interface and the second interface are operable to transmit bus cycles over the serial bus.

44. The bridge of claim 42, wherein the first interface is operable to receive first bus cycles on the first bus and generate first serial data on the serial bus in response thereto;
   wherein the second interface is operable to receive the first serial data from the serial bus and generate second bus cycles on the second bus.

45. The bridge of claim 44, wherein the second interface is operable to receive third bus cycles on the second bus and generate second serial data on the serial bus in response thereto;

wherein the first interface is operable to receive the second serial data from the serial bus and generate fourth bus cycles on the first PCI bus.

46. The bridge of claim 42, wherein the serial bus has a length greater than one meter;
   wherein the second interface is located greater than one meter from the first interface.

47. The system of claim 42, wherein the serial bus has a length that ranges from 2 meters to 2 kilometers;
   wherein the second interface is located between 2 meters and 2 kilometers from the first interface.

48. The bridge of claim 42, wherein the first interface, the second interface, and the serial bus collectively implement the single bridge.

49. The bridge of claim 42, wherein the first interface and the second interface collectively implement a bridge register set for the single bridge.

50. A first interface usable in expanding access over a first bus to a second bus, the first interface comprising:
   first bus interface circuitry operable to couple to the first bus for interfacing to the first bus; and
   a serial interface for interfacing to a serial bus;
   parallel/serial transceivers for converting parallel data generated on the first bus to serial data for transmission on the serial bus and for converting serial data received from the serial bus to parallel data for generation on the first bus;
   wherein the first interface is operable to receive first bus cycles on the first bus and generate first serial data on the serial bus in response thereto;
   wherein the first interface is operable to receive second serial data from the serial bus and generate second bus cycles on the first bus in response thereto;
   wherein the first interface implements a first portion of a bridge;
   wherein the first interface is operable to interface through the serial bus to a second interface, wherein the second interface is operable to interface to the second bus located at a remote location relative to the first bus;
   wherein the first interface and the second interface operate as a single bridge;
   wherein the first interface operates as a first portion of a bridge, and wherein the second interface operates as a second portion of the bridge.

51. The bridge of claim 50,
   wherein the serial interface is operable to interface to a serial bus having a length greater than one meter;
   wherein the second interface is operable to be located greater than one meter from the first interface.

52. The system of claim 50, wherein the first interface, the second interface, and the serial bus are operable to collectively implement a bridge register set for the single bridge.

53. The system of claim 50,
   wherein the first bus is the PCI bus;
   wherein the first bus interface circuitry comprises PCI bus interface circuitry.

54. The system of claim 50, wherein the first interface and the second interface operate as a single bridge.

55. The system of claim 50, wherein the first interface implements at least a portion of a bridge register set for the single bridge.

56. A first interface usable in expanding access over a first bus to a second bus, the first interface comprising:
   first bus interface circuitry operable to couple to the first bus for interfacing to the first bus; and
   a serial interface for interfacing to a serial bus;
   parallel/serial transceivers for converting parallel data generated on the first bus to serial data for transmission on the serial bus and for converting serial data received from the serial bus to parallel data for generation on the first bus;
   wherein the first interface is operable to receive first bus cycles on the first bus and generate first serial data on the serial bus in response thereto;
   wherein the first interface is operable to receive second serial data from the serial bus and generate second bus cycles on the first bus in response thereto;
   wherein the first interface implements a first portion of a bridge.

57. A first interface usable in expanding access over a first PCI bus to a second PCI bus, the first interface comprising:
   first PCI bus interface circuitry operable to couple to the first PCI bus for interfacing to the first PCI bus; and
   a serial interface for interfacing to a serial bus;
   parallel/serial transceivers for converting parallel data generated on the first PCI bus to serial data for transmission on the serial bus and for converting serial data received from the serial bus to parallel data for generation on the first PCI bus;
   wherein the first interface is operable to receive first PCI bus cycles on the first PCI bus and generate first serial data on the serial bus in response thereto;
   wherein the first interface is operable to receive second serial data from the serial bus and generate second PCI bus cycles on the first PCI bus in response thereto;
   wherein the first interface implements a first portion of a PCI—PCI bridge.

* * * * *